United States Patent
Sharp et al.

(10) Patent No.: US 9,823,561 B2
(45) Date of Patent: Nov. 21, 2017

(54) METHOD AND APPARATUS FOR JOINING SCREEN MATERIAL FOR MINIMAL OPTICAL DISTORTION

(75) Inventors: Gary D. Sharp, Boulder, CO (US); David A. Coleman, Louisville, CO (US); Darlene K. Kondo, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 13/549,304

(22) Filed: Jul. 13, 2012

(65) Prior Publication Data

US 2013/0017371 A1    Jan. 17, 2013

Related U.S. Application Data

(60) Provisional application No. 61/507,574, filed on Jul. 13, 2011.

(51) Int. Cl.
*B32B 37/12* (2006.01)
*G03B 21/56* (2006.01)

(52) U.S. Cl.
CPC ......... *G03B 21/56* (2013.01); *Y10T 156/1089* (2015.01); *Y10T 428/24752* (2015.01)

(58) Field of Classification Search
CPC . B29C 66/43; B29C 66/1122; B29C 66/1142; G03B 21/56; G03B 15/1605
USPC .................................................. 428/58, 57
See application file for complete search history.

(56) References Cited

U.S. PATENT DOCUMENTS

| | | | |
|---|---|---|---|
| 1,856,739 A * | 12/1929 | Alt et al. | 428/61 |
| 6,246,330 B1 * | 6/2001 | Nielsen | 340/604 |
| 7,068,427 B2 | 6/2006 | Hopkins | |
| 2003/0021938 A1 * | 1/2003 | Kraft et al. | 428/58 |
| 2005/0034614 A1 | 2/2005 | Kasuya | |
| 2009/0297797 A1 | 12/2009 | Coleman et al. | |
| 2011/0157695 A1 * | 6/2011 | Katsenelenson | G03B 21/56 359/449 |
| 2012/0229894 A1 * | 9/2012 | Coleman et al. | 359/443 |
| 2012/0282425 A1 * | 11/2012 | Gallagher | 428/61 |

FOREIGN PATENT DOCUMENTS

| | | |
|---|---|---|
| CN | 1963660 A | 5/2007 |
| JP | 03-020729 A | 1/1991 |
| JP | 2005283749 A | 10/2015 |

(Continued)

OTHER PUBLICATIONS

International search report and written opinion of international searching authority for PCT/US12/46793, dated Jan. 22, 2013.

(Continued)

*Primary Examiner* — Brent O'Hern
(74) *Attorney, Agent, or Firm* — Penny L. Lowry; Neil G. Mothew

(57) ABSTRACT

The present disclosure describes a manufacturing method for seaming materials. The process may be suitable for manufacturing high performance projection screens using a number of methods including, but not limited to, conventional (convert-before-coating) methods, or convert-after-coating methods. An objective of the present disclosure is to identify a process which may substantially minimize distortion of the local surface normal in the vicinity of the join.

11 Claims, 2 Drawing Sheets

(56) References Cited

FOREIGN PATENT DOCUMENTS

WO     2011068907 A1     6/2011

OTHER PUBLICATIONS

Office Action and Search Report from Chinese Patent Application No. 201280044119.8 dated Apr. 17, 2015.
Office Action from Chinese Patent Application No. 201280044119.8 dated Dec. 14, 2015.
Office Action for Chinese Application No. 201280044119.8, dated Apr. 17, 2015.

* cited by examiner

METHOD AND APPARATUS FOR JOINING SCREEN MATERIAL FOR MINIMAL OPTICAL DISTORTION

CROSS-REFERENCE TO RELATED APPLICATIONS

This application claims priority to U.S. Provisional Patent Application Ser. No. 61/507,574 filed Jul. 13, 2011, entitled "Method and apparatus for joining screen material for minimal optical distortion," the entirety of which is herein incorporated by reference.

TECHNICAL FIELD

The present disclosure generally relates to joining materials, and more specifically, to joining screen materials such as front projection screens, including polarization preserving front projection screens.

BACKGROUND

Generally, cinema front projection screens are manufactured using low modulus substrates such as plasticized polyvinyl chloride (PVC), approximately on the order of 300 microns in thickness. One of the benefits of such a substrate is that distortions that affect the local surface normal, which can affect screen appearance, are removed when the material is placed under tensile load. This is particularly so for screens with highly sloped gain profiles, such as those used to preserve polarization in stereoscopic 3D systems.

Conventional screens are manufactured according to a "coat-after-converting" process. That is, roll stock is converted to full-size by joining vertical strips, one meter or more in width, after which and when appropriate an optically functional coating is applied. In a cinema environment, sound systems are often mounted behind the screen, requiring periodic perforations for high frequency transmission. The joining of the vertical strips may take into account registration of perforations across the seam, in order to avoid spatial-averaged intensity non-uniformities that can be visually observable. Moreover, the joining process attempts to avoid gaps, wrinkles, distortions, and anything that affects the screen surface in a manner that is visually resolvable. There are a few accepted joining methods for PVC screens, each with process-specific challenges.

BRIEF SUMMARY

According to the present disclosure a method for joining materials may include locating a first edge of a first piece of material adjacent to a first edge of a second piece of material to create a seam and locating a first side of a third piece of material adjacent to the seam, in which the optical effect of the distortion of the local surface normal in the vicinity of the seam is substantially minimized. The first and second piece of material may be substrates with a first side coated with optically functional material and may be substrates with a relatively high tensile modulus. The third piece of material may be adjacent to the seam, and may adhere to the seam by using an adhesive such as a PSA, which may be a curable adhesive and in one embodiment, may be cured with UV radiation. Further, the third piece of material may adhere to the first and second pieces of material on the second side opposite the first side coated with optically functional material. The adhesive may exhibit low to substantially zero wicking through the seam to the optically functional material and may exhibit minimal shrinkage when cured. In one embodiment, the first and second pieces of material and the backer may be the same type of substrate. In an embodiment as illustrated in FIG. 5 below, a first substrate is located proximate to a second substrate to form a seam therebetween; a backer 510 is adhered-over a seam edge portion of the first substrate; a seam edge portion of the second substrate, and the seam between the first and second substrates; the first and second substrates each comprise a solid body throughout the respective seam edge portion; and perforations 550 are formed through the first and second substrates outside the respective seam edge portion of the first and second substrates, whereby the tensile strength between the backer and the seam edge portions of the first and second substrates is substantially consistent throughout the seam edge portions.

According to another aspect, a projection screen may be a first substrate located proximate to a second substrate to form a join and a backer may be adhered adjacent to the join such that the optical effect of the distortion of the local surface normal in the vicinity of the seam may be around or less than a just noticeable difference. Each of the first and second substrate may include a first side coated with an optically functional material and may be substrates with a relatively high tensile modulus. The backer may be adhered to the first and second substrates on the second side of the substrates opposite the first side of the substrates which may be coated with the optically functional material. Further, the backer may adhere to the first and second substrates by way of an adhesive that may exhibit low to substantially zero wicking through the seam to the optically functional material. The adhesive may be a UV curable adhesive which may exhibit minimal shrinkage when cured.

According to yet another aspect of the present disclosure, a method for forming a projection screen may include registering a second piece of substrate to a first piece of substrate to create a seam and may include applying a backer strip, which may have sufficient tack to substantially secure the backer strip to the first and second piece of substrate approximately at the seam. The distortion and/or optical effect of the distortion of the local surface normal in the vicinity of the seam may also be substantially minimized. The backer may be applied by employing a UV cure to the backer strip.

These and other advantages and features of the present invention will become apparent to those of ordinary skill in the art upon reading this disclosure in its entirety.

BRIEF DESCRIPTION OF THE DRAWINGS

Embodiments are illustrated by way of example in the accompanying figures, in which like reference numbers indicate similar parts, and in which.

DETAILED DESCRIPTION

According to the present disclosure a method for joining materials may include locating a first edge of a first piece of material adjacent to a first edge of a second piece of material to create a seam and locating a first side of a third piece of material adjacent to the seam, in which the optical effect of the distortion of the local surface normal in the vicinity of the seam is substantially minimized. The first and second piece of material may be substrates with a first side coated with optically functional material and may be substrates with a relatively high tensile modulus. The third piece of material may be adjacent to the seam, and may adhere to the seam by using an adhesive such as a PSA, which may be a curable adhesive and in one embodiment, may be cured with UV radiation. Further, the third piece of material may adhere to the first and second pieces of material on the second side opposite the first side coated with optically functional material. The adhesive may exhibit low to substantially zero wicking through the seam to the optically functional material and may exhibit minimal shrinkage when cured. In one embodiment, the first and second pieces of material and the backer may be the same type of substrate.

According to another aspect, a projection screen may be a first substrate located proximate to a second substrate to form a join and a backer may be adhered adjacent to the join such that the optical effect of the distortion of the local surface normal in the vicinity of the seam may be around or less than a just noticeable difference. Each of the first and second substrate may include a first side coated with an optically functional material and may be substrates with a relatively high tensile modulus. The backer may be adhered to the first and second substrates on the second side of the substrates opposite the first side of the substrates which may be coated with the optically functional material. Further, the backer may adhere to the first and second substrates by way of an adhesive that may exhibit low to substantially zero wicking through the seam to the optically functional material. The adhesive may be a UV curable adhesive which may exhibit minimal shrinkage when cured.

According to yet another aspect of the present disclosure, a method for forming a projection screen may include registering a second piece of substrate to a first piece of substrate to create a seam and may include applying a backer strip, which may have sufficient tack to substantially secure the backer strip to the first and second piece of substrate approximately at the seam. The distortion and/or optical effect of the distortion of the local surface normal in the vicinity of the seam may also be substantially minimized. The backer may be applied by employing a UV cure to the backer strip.

Figure 1:
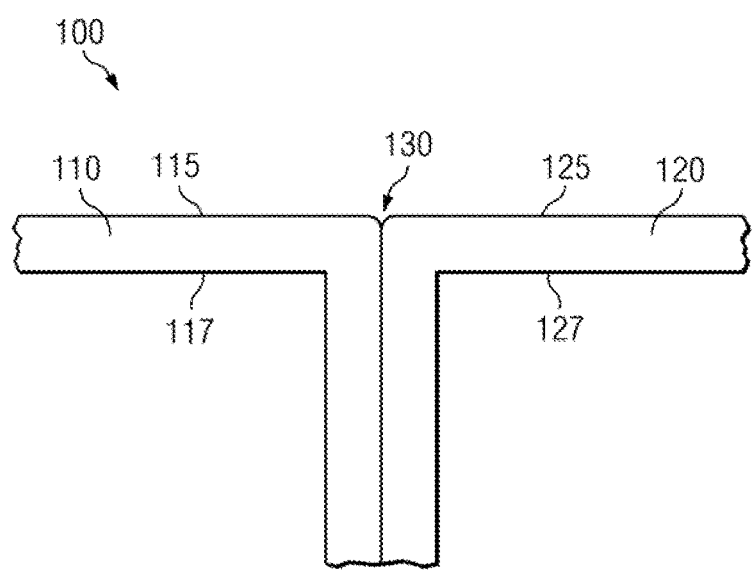
FIG. 1 is a schematic diagram illustrating one embodiment of a join.

A planarized conventional seam is one method used for screen joining. Through one of several processes such as RF welding, laser welding, and so on, the substrate material is thermally joined face-to-face, as illustrated in FIG. 1 and assuming that the substrate has a front and back surface. This is followed by a second thermal step, in which the screen surface is flattened. This forms a T-join, having the benefit that there is relatively little lateral extent in the disruption of substrate thickness across the join. As such, surface normal distortion across the join is relatively low when it is placed under cross-seam mechanical load or the tensile load approximately perpendicular to the join. Another benefit is that, when done properly, the screen joins may be difficult to see from a normal viewing distance.

FIG. 1 is a schematic diagram illustrating one embodiment of a T-join. FIG. 1 includes an example of a T-join 100, which may include a first piece of substrate 110, a second piece of substrate 120, and a seam 130. The first piece of substrate 110 has a first front surface 115 and a first back surface 117 while the second piece of substrate 120 has a second front surface 125 and a second back surface 127. As illustrated in FIG. 1 and as previously discussed, the first front surface 115 and the second front surface 125 may be thermally joined face to face, assuming that the front surface is the optically relevant surface of the substrate The flattening of the join is a thermal forming process that is not conducive to substrates with pre-existing surface texture, which would be damaged by the associated planarization. Optically functional texture can be beneficial in broadening the gain profile, but it is prohibited by this type of joining process. Consequently, it is most appropriate for joining substrates with featureless surfaces in a coat-after-converting screen manufacturing process. In such a process, the screen coating has the potential to provide additional planarization, which further reduces the visibility of a seam.

Figure 2:
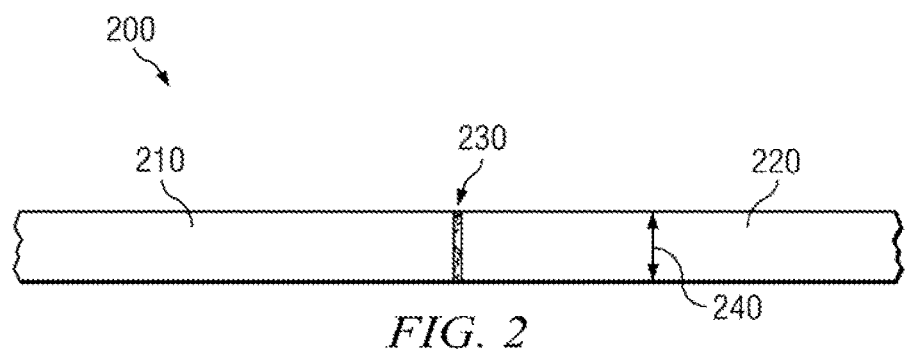
FIG. 2 is a schematic diagram illustrating another embodiment of a join.

The above seaming process does not support a convert-after-coating manufacturing methodology, as coated surfaces would be damaged by the planarization step. Additionally, the coating materials can compromise the integrity of the bond. An alternative that in principle can avoid contact with the substrate/coating surface may be a butt-joint as illustrated in FIG. 2. This involves butting precisely slit material and joining the walls of the substrate. However, given typical material slitting accuracy, fixturing control, and the scale of the product, issues may arise. Moreover, since a screen substrate may be thin, for example a thickness on the order of approximately three to ten mils, there may not be enough surface area for a simple butt-joint to be durable enough to withstand typical screen loads.

FIG. 2 is a schematic diagram illustrating another embodiment of a join. FIG. 2 illustrates one example of a butt-joint 200, which may include a first piece of substrate 210, a second piece of substrate 220, and a seam 230. As previously discussed, the thickness 240 of the material may be on the order of less than approximately ten mils. As such, additional reinforcing elements may be utilized to ensure that the seam is reliable.

One technique includes applying a backer strip, often using the same material as the substrate, which may form a reinforced butt joint (RBJ). The backer strip can be applied after the butt joint, or more likely, as a single process step. One such example may use a backer strip with a single laser welding step. This process may allow the screen substrate to be tightly butted (to avoid a visually resolvable gap), and thus, all three pieces may be tightly fixtured. In many instances, down-force may be utilized to ensure that the backer remains in contact with the join during the application of heat. A strong bond can be obtained when sufficient heat is applied, such that material from each substrate flows and may form a monolithic weld region.

Cinema screens may be perforated, and the backer typically may lie approximately between the perforations, which can limit tensile strength. The backer may be placed by registering the backer between the perforations. Furthermore, the application of heat to form the weld can cause local distortion that may affect the screen surface normal distribution, and can destroy any pre-existing surface texture or coatings. For example, in processes which may convert the material after coating, optically functional layers may absorb thermal energy which may destroy the desired screen scattering characteristics. In one example, a metal reflective layer may absorb laser welding radiation which may destroy the desired screen scattering characteristics.

In one embodiment, the RBJ process may employ a backer that effectively increases the substrate thickness over the width of the join. Furthermore, when using low modulus substrate, the resulting decrease in elongation may cause distortion in the local surface normal when it is placed under tensile load. This distortion or read-through can be relatively large in lateral dimension, and thus may be easily observable in the audience. The distortion may be more apparent in high gain screens. This issue may be overcome using a low-elongation substrate material and the optical effect of the distortion may be approximately around or less than a just noticeable difference (JND).

Many high strength joining processes may deliver heat to the substrate materials as a means of creating a bond. This may include, but is not limited to, welding processes, whether through contact such as mechanical agitation, heated tool, etc . . . , non-contact such as heated air or absorption of radiation, or chemical processes such as solvent welding. In addition to bond strength, it may be desirable to preserve substrate surface flatness, and in some cases, when appropriate, protecting coatings and desired surface textures from thermal energy. Heat may cause substrate relaxation, deformation, and stresses that may be difficult to remove or that cannot be removed through reasonable mechanical load. As such, thermal processes that may decrease and/or minimize the total energy absorbed by the substrate may be desirable, regardless of the actual substrate material. For example, processes that apply heat to the materials externally may be disadvantaged relative to those processes that apply heat substantially and primarily where it is needed. An example of applying heat where needed in an RBJ process, is to coat an inert dye on the backer and to apply laser radiation at a wavelength in which primarily the dye may absorb significant radiation. This process has a higher probability of not exceeding the thermal distortion budget than one that may heat the substrates externally. Solvent welding processes can also have advantages in this regard, provided that the solvent may not penetrate and thus, may not compromise the mechanical strength of the substrates. Preferred solvents, which may be selected specific to the substrate material, may soften a thin layer of surface material to form the join.

An alternative to thermal bonding is to introduce a material that may bond to surfaces adhesively via a cross-linking/curing process. Since adhesives may be activated by heat, for example thermo-set adhesives, many of the aforementioned thermal distortion issues may persist. Moreover, there may be additional concerns that the adhesive shrinks during cure, and may not be well matched in coefficient of thermal expansion (CTE) to the substrate. When introducing a foreign material, such as an adhesive, to form the bond, care should also be taken to ensure that the adhesive has the appropriate mechanical properties in order to produce suitable product reliability. For instance, a high-durometer adhesive may not have sufficient flexibility or compliance to be used with a typical screen substrate. From a practical standpoint, the use of thermal-cure adhesives may involve significant time to form a reliable bond, and as such, are typically not conducive to high manufacturing throughput.

Alternatively, radiation-cure adhesives, such as but not limited to, UV cures, have benefits including initiation of cross-linking with little heat or in the absence of heat. There may be relatively modest energy released in the curing reaction, but a more practical concern is that photo-initiators may typically absorb in a wavelength range over which the substrate, and other materials in the radiation path, also absorb. This can typically be managed through a program of careful selection of materials and optical filtering. An attractive aspect of radiation cure adhesives is that, in many instances, the cure rate may be sufficient to support high manufacturing throughput.

Figure 3:
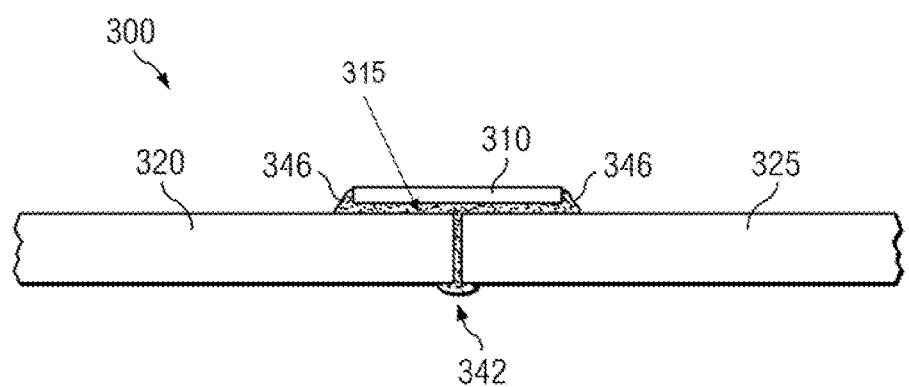
FIG. 3 is a schematic diagram illustrating another embodiment of a join, in accordance with the present disclosure.

A general concern with a liquid adhesive process is that it may be difficult to control the distribution of fluid prior to curing. In one example and as illustrated in FIG. 3, a process may include a liquid adhesive that may be dispensed and distributed onto the backer, which may then be pressed onto the butt-joint. FIG. 3 is a schematic diagram illustrating another embodiment of a join. FIG. 3 illustrates one example of a butt-joint 300, which may include a backer 310, a first piece of material 320, a second piece of material 325, and adhesive 315. The backer may be pressed onto the butt-joint in various ways including, but not limited to, with a roller, with a press, and so on. Issues can arise prior to curing, including wicking through the butt-joint and onto the optically functional coatings as illustrated by the wicked adhesive 342. Additionally, there may be lateral flow of adhesive out of the bond region, which may cause a decrease in the bondline thickness and may cause a significant amount of adhesive to flow outside of the joint, which may form a fillet 346. As with the illustrative figures included in the disclosure, FIG. 3 is for discussion purposes only and not of limitation and is not illustrated to scale.

Given typical adhesive viscosities, for example, of a few thousand cP, the wicking can occur much more rapidly than the adhesive can be cured. An optically thick layer of clear adhesive deposited on the face of the screen can modify the optical properties in a manner that would be apparent if it were cured. If not, and assuming that the liquid does not penetrate the optically functional material, the adhesive could be cleaned off during take-up onto the core.

In the absence of down-force, for example from a roller, a backer may self-settle. Bubbles can remain, and the bondline may not be controlled, often varying significantly with conditions such as batch-to-batch viscosity variation, inconsistent method for laying down the backer, temperature, and so on. In the example, when a roller is used, it may be difficult to maintain adequate bondline thickness with typical fluid viscosities. Many adhesives have a lower limit on bondline thickness needed to achieve adequate strength, reliability, and desired mechanical properties. This can be greater than approximately 25 microns, and more preferably in some cases more than approximately 50 microns. Adding fillers to increase the viscosity, or introducing a spacer technology, can be effective, but can compromise performance and reduce the dispense speed, and therefore manufacturing throughput.

Adhesive that flows out of the joint when the backer is deposited, can pool which may form a fillet between the backer wall and substrate. When cured and assuming the adhesive cures in the presence of oxygen, a thick section of adhesive can introduce stress that may distort the screen surface normal. It is likely not practical to remove this excess adhesive prior to curing in a manufacturing situation.

Yet another issue may be that a typical liquid adhesive-based RBJ process may employ mechanical fixturing during cure in order to maintain tight registration and positioning of the components. In the absence of fixturing, consequences can include gap-separation of the material join, variation in surface step height across the join, bubbles, and irregularity in adhesive bondline thickness. Given the extent of screen dimensions, it can be impractical to provide such fixturing over extended ranges in a manufacturing environment.

Yet another issue with an adhesive-based RBJ process is that fixturing can produce stresses that are permanently stored in the product. In the event that a mechanical load, such as a down-force, is employed to maintain the registration and positioning of the films during cure, the associated stress can cause distortion of the surface, which may persist after cure. Furthermore, such a down-force can create a compromise between fixturing control and bondline thickness, as discussed above. In the event that curing may occur while the substrates are under mechanical load, it can be difficult to identify a manufacturing method that provides simultaneous mechanical fixturing and cure illumination that is conducive to large scale manufacturing.

Based on these factors, a manufacturing methodology may be desired in which the control of adhesive flow and thickness are not an issue, and curing requirements that substantially do not result in stresses that produce screen artifacts and hamper manufacturing throughput. One possible solution to this may be to use a pressure sensitive adhesive (PSA), which in a RBJ context may take the form of a tape.

In this case, the backer can be a tape that may be applied to the butted material with a roller. Curing may not be employed, and manufacturing throughput may be high because the bond occurs virtually upon contact. Though bond strength typically increases over time, most of the pull strength and peel strength may be provided initially after application. High tack PSAs may provide sufficient strength so that screen material can be rolled onto a reasonable diameter core with little to substantially no delamination.

Figure 4:
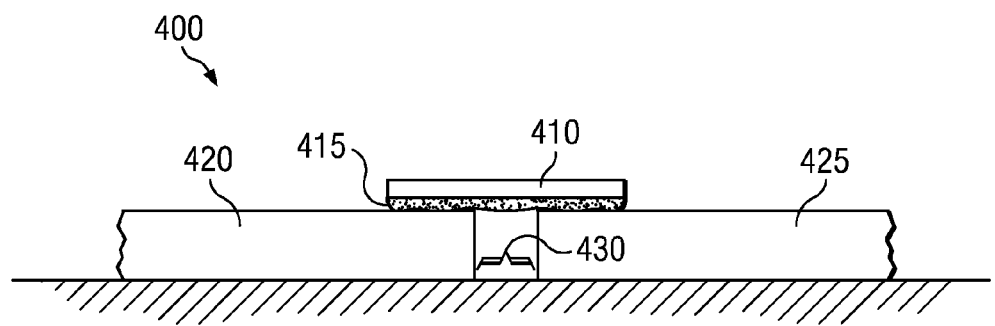
FIG. 4 is a schematic diagram illustrating another embodiment of a join, in accordance with the present disclosure.

FIG. 4 is a schematic diagram illustrating one embodiment of a join. As shown in FIG. 4, the seam example 400 includes a backer 410, adhesive 415, a first piece of material 420, a second piece of material 425, and a gap 430. The elements in FIG. 4 are provided for explanatory purposes only and not of limitation. Additionally, FIG. 4 is not to scale. The first and second piece of materials 420 and 425 respectively, may be the substrates as discussed herein. Further, in one example, the gap 430 between the first and second pieces of material 420 and 425 may be on the order of approximately tens of microns. The backer 410 may include an adhesive 415 which in one example may be a cross linking PSA, which will be described in more detail herein. Although FIGS. 2-5 illustrate the adhesive between the backer and the substrate as speckled, the adhesive may be clear, milky, include particulates in the adhesive, opaque, or any combination thereof.

In one example, the adhesive 415 may be directly adjacent to and substantially in contact with each of the back sides of the first piece of material 420 and the second piece of material 425. Furthermore, the adhesive 415 may not seep into the gap 430 and may not be visible from the front sides of the two pieces of material. Stated differently, after application of the backer 410 and adhesive 415 to the two pieces of material, the adhesive 415 may not be visible from the opposite side of the two pieces of material. Moreover, the first and second pieces of material may be the same substrate, and in one example, the backer substrate may be the same material as the substrate as the first and second pieces of material. Additionally, the backer substrate may be the same material or different material than the first and second pieces of material. The properties of the join such as material properties, backer properties, adhesive properties, size of gap, strength of adhesive, criteria for selection of material, backer and adhesive, strength properties and so on will be described in further detail herein. Although only two pieces of material are discussed in the joining process, additional sheets may be added to either side and joined to form a larger overall, seamed piece of material such as a screen.

Figure 5:
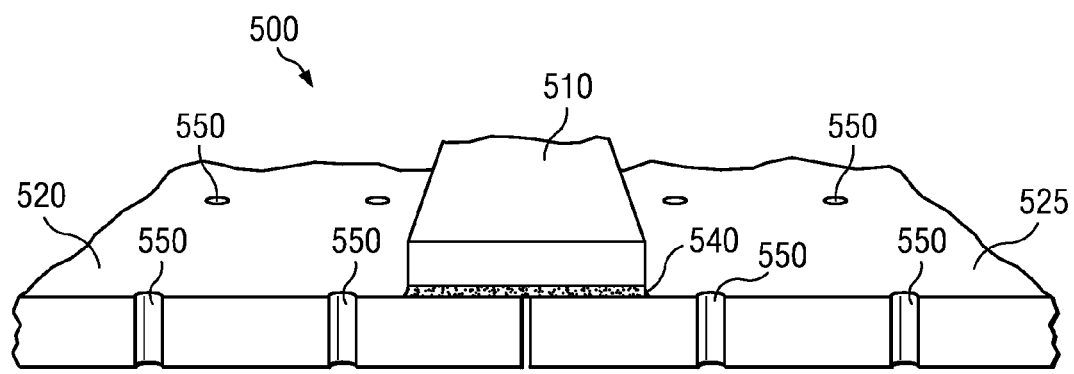
FIG. 5 is a schematic diagram illustrating another embodiment of a join, in accordance with the present disclosure.

Some currently available PSAs may be a poor choice for joining front-projection screen sections. In conventional vinyl-based screens, substrate mechanical properties such as dimensional stability and tensile modulus, may not lend themselves to a PSA solution. Moreover, the long term reliability of a PSA in the presence of plasticizers used in such substrates may be a concern. As such, higher modulus substrates such as, but not limited to, PC or biaxially stretched Polyethylene Terphthalate (PET) may be suitable for a stronger, more reliable PSa bond. However, given that backers widths may be selected to reside between perforations as illustrated in FIG. 5, the PSA may provide high strength in a narrow backer width. FIG. 5 is a schematic diagram illustrating another embodiment of a butt joint 500, which may include a backer 510, a first piece of material 520, a second piece of material 525, adhesive 540, and perforations 550. As illustrated in FIG. 5, the backer 510 may be located approximately between the perforations 550 located on both the first and second piece of material 520, 525, respectively.

A hole or perforation diameter may be approximately one mm to accommodate the perforation pitch to be less than approximately five mm, which may allow bonding to a ledge of approximately two mm on each substrate. When a screen is loaded cross-seam, the adhesive may be placed under shear stress. It can be challenging to identify a PSA with high enough shear strength, which also has enough compliance to meet peel strength requirements. Typical peel strength may be approximately one lb/in and shear strength may exceed 25 lb/in. The mechanical characteristics of the bond may depend upon PSA chemistry and thickness, substrate surface chemistry and preparation, and environmental factors such as temperature.

Certain PSAs such as silicone in one example, may exhibit high elongation, providing relatively good peel strength, but may fail pull testing due to insufficient tack. In a narrow backer width, a representative tensile load cross-seam may cause either a catastrophic failure, or significant elastic deformation of the butt joint. The gaps that open under load can be large enough that they may be visually observable in a finished screen. In the long term, PSAs can suffer from creep issues, where the gap grows inelastically. Creep can represent a catastrophic failure mode.

Certain other PSAs, such as acrylic PSAs may have sufficient tack, but may fail peel testing. Such PSAs may be relatively less prone to issues with elastic deformation and creep. However, the lack of compliance may make high tack PSAs relatively sensitive to handling, and as such, a screen manufactured with such a PSA may not be sufficiently robust. Seams can fail catastrophically by rolling the material onto a core, or the seam may not survive shipping and installation procedures.

In high quality front projection installations, the screen may be under some mechanical load to ensure uniform appearance. With a high modulus substrate such as PET or PC, this loading may be substantially in the machine direction (MD), and may therefore be substantially parallel to the join. However, some side-loading substantially perpendicular to the join may be employed to ensure that the screen does not sag near the edge. The tensile load substantially perpendicular to the seam may be some fraction of a pound/inch. Given the narrowness of a typical backer, this may be sufficient for gap separation to immediately occur.

The gap between screen sections may be held to a maximum of approximately tens of microns in fabrication, but when placed under representative load, the gap may become a multiple of that. As discussed above, this may be sufficient that the gap under load may be noticeable in a cinema audience. Again, this may not be an elastic phenomenon. Stated differently, the gap may not return to the initial value when the load is removed. Should the gap increase over time as in the case of creep, the seam may ultimately fail.

The present disclosure is generally applicable to any joining process in which moderate strength under tensile load is employed, along with a high degree of surface flatness. The process may be employed with screens manufactured using a convert-after-coating approach, where fragile optically functional materials are already coated onto relatively high modulus substrate. Such a screen manufacturing approach may be attractive because it may facilitate roll-to-roll manufacturing of highly controlled microstructures employed for precise scattering properties. Furthermore, this approach may enable roll-to-roll slitting, perforation, and processing of other functional coatings, such as hard coats, reflectivity enhancement layers, hydrophobic layers and sealants, and thus may allow a sophisticated product at a low price.

Additionally, the present disclosure describes a manufacturing method for high performance screen seaming that may be substantially free of the above issues. The process may be suitable for manufacturing screens using a number of methods including, but not limited to, conventional (convert-before-coating) methods, or convert-after-coating methods. An objective of the present disclosure is to identify a process which may substantially minimize distortion of the local surface normal in the vicinity of the join such that the average surface normal within approximately a one $mm^2$ area varies by less than approximately 0.2 degrees. Aspects of the present disclosure may be as described below.

Substrate Mechanical Properties

The appropriate substrate may depend on various substrate mechanical properties discussed herein. A relatively high tensile modulus material may be preferred as the substrate. Stated differently the substrate may include the mechanical property of low elongation when placed under a load. This may also be preferred for other aspects of the screen fabrication, such as UV embossing of microstructures.

Additionally, the surface energy and/or wetability of the substrate may be taken into account. The surface energy and/or wetability may be a mechanical property of the material either as-fabricated, or as a result of activation and may be sufficient to achieve adhesive strength. Further, the ability of the substrate to meet fire retardant requirements, either directly or via additives. Additives may not impair initial bond strength, or produce long-term reliability concerns. Also, the substrate material may be compatible with converting processes, such as slitting and perforation. Edges/holes may be of sufficient quality such that there are no visual artifacts.

Adhesive Control

The appropriate adhesive may depend on various properties such as, but not limited to, the following: bondline thickness control, low to substantially zero wicking to functional coatings, compatibility with roller applicator, and little to substantially no adhesive accumulation at the backer wall.

Stress Control of the Substrate

In one embodiment, stress control may depend on various properties discussed below. Thermal loading may be reduced and/or substantially minimized during the cure. In one example, the radiation cure may be at a wavelength that the adhesive photoinitator absorbs. Also, an adhesive with minimal shrinkage when cured may be desirable.

In another example, some adhesive compliance may be maintained after full cure, which may be appropriate to maintain the appropriate seam robustness. Additionally, during final cure, the fixturing load may be substantially minimized. Also, in some cases, it may be desirable to have substantially minimal to approximately zero adhesive fillet stress.

Manufacturing Throughput

Manufacturing throughput also may take various factors into account, some of which will be discussed below.

Although various methods may be used to apply the backer, some methods may be better suited to a high throughput for manufacturing. For example, although the backer may be applied using a press, a roller may be better suited for high speed lamination and may reduce bubbles between the backer and the substrate. Additionally, adequate initial PSA tack may be employed to ensure stability of the join prior to final cure, such that fixturing may not necessarily be employed.

The curing process may also affect the manufacturing throughput. As such, a high speed secondary cure process may be employed. In one example, the cure process may be radiation based. Also, as the cure process approaches near final strength as-cured, this may allow take-up on a core with little to substantially no reliability concerns. Additional cross-linking after the initial cure may take place over a longer time frame.

Functional Factors

Various functional factors may be taken into account for the manufacturing process and may include, but are not limited to, high tensile/shear strength of the RBJ seam, high peel strength of backer to the butt joint/RBJ, approximately sub tens of micron elastic deformation under approximately one lb/inch cross-seam load, low to substantially zero creep under approximately one lb/inch cross-seam load, short-term reliability of join in shipping/storage environments, short-term reliability of join in shipping/storage environments, and so forth.

In one manufacturing scenario, the seaming may be accomplished in a two step adhesive process. Spools of backer tape may be prepared for loading into a roll application machine. A UV cross-linkable PSA may be initially roll-to-roll wet coated to a prescribed thickness, for example approximately tens of microns, onto a substrate, which may then pass through an oven to drive off solvents. A low surface energy strip-sheet may then be applied to protect the coating and taken up onto a core. This substrate may then be slit to an appropriate width. In one example, an appropriate width may be less than the distance between the perforations when applicable and taken up onto reels. The substrate material/thickness for the backer may be selected on the basis of optical and mechanical performance optimization. In one embodiment, the backer may be the same material as the screen substrate.

Slit and in some cases possibly perforated screen material may be placed with functional layers face-down on a substantially flat seaming table. The length of the strip cut from the roll may be slightly longer then the finished screen height. In one approach, a first single piece may be initially and approximately aligned under machine direction (MD) tensile load onto the table, followed by a hold-down mechanism, such as a weighting mechanism or vacuum. Subsequently, a second piece may be registered to the first piece, in such a way that the two material pieces may be "tightly" butted so that gaps between the pieces may be substantially minimized. In one example, vacuum may be pulled on the second sheet to maintain registration between the two sheets/pieces. A gantry system which may include a vision system may inspect the butt joint prior to lamination. A roll applicator, which may also be attached to the gantry system, may place the backer tape at the start of lamination, traveling the length of the strip until the lamination is complete. The adhesive may have sufficient tack so that the substrates and backer remain substantially, securely fastened after the roller has completed the lamination. A UV cure illumination system, which may be UV LED based can cure the PSA after being applied by the roller, in a subsequent pass of the gantry system, or at any time after the PSA is placed on the join. After curing, the backer may be cut, and the finished seamed material may be taken up on a core, likely with an interleaf to substantially prevent the substrate from taking impressions of the backer. When precision placement of the backer is desirable such as when a narrow backer tape is placed between perforations, some roller steering mechanism may likely be employed. The mechanical properties of the fully cross-linked PSA were previously discussed.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than approximately one percent to ten percent.

It should be noted that embodiments of the present disclosure may be used in a variety of optical systems and projection systems. The embodiment may include or work with a variety of projectors, projection systems, optical components, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A projection screen comprising:
   a first substrate located proximate to a second substrate to form a seam therebetween, wherein the first substrate and second substrate each comprise a first side coated with an optically functional material thereby forming a part of a projection screen having a gain; and
   a backer adhered over a seam edge portion of the first substrate, a seam edge portion of the second substrate, and the seam between the first and second substrates, wherein a UV crosslinked pressure sensitive adhesive is located between the backer and the first side of the first and second substrates;
   wherein the first and second substrates each comprise a solid body throughout the respective seam edge portion and perforations are formed through the first and second substrates outside the respective seam edge portion of the first and second substrates whereby the tensile strength between the backer and the seam edge portions of the first and second substrates is substantially consistent throughout the seam edge portions.

2. The projection screen of claim 1, wherein the first and second substrates comprises a material having a tensile modulus greater than that of plasticized polyvinyl chloride.

3. The projection screen of claim 1, wherein the backer is adhered to the first and second substrates on the second side opposite the first side coated with an optically functional material.

4. The projection screen of claim 1, wherein the backer is adhered to the first and second substrates by way of an adhesive that exhibits approximately zero wicking through a seam in the join.

5. The projection screen of claim 1, wherein the UV crosslinked pressure sensitive adhesive exhibits minimal shrinkage.

6. A projection screen comprising:
   a first substrate located proximate to a second substrate to form a seam therebetween, wherein the first substrate and second substrate each comprise a first side coated with an optically functional material thereby forming a part of a projection screen having a gain; and a backer adhered to a second side of the first and second substrates opposite to the first side, the backer being over a seam edge portion of the first substrate, a seam edge portion of the second substrate, and the seam between the first and second substrates;

wherein the first and second substrates comprise a material having a tensile modulus greater than that of plasticized polyvinyl chloride;

wherein the first and second substrates each comprise a solid body throughout the respective seam edge portion and perforations are formed through the first and second substrates outside the respective seam edge portion of the first and second substrates whereby the tensile strength between the backer and the seam edge portions of the first and second substrates is substantially consistent throughout the seam edge portions.

7. The projection screen of claim 6, wherein the backer is adhered to the first and second substrates by way of an adhesive that exhibits approximately zero wicking through a seam in the join.

8. The projection screen of claim 6, wherein the backer adhered adjacent to the join is adhered using an ultraviolet crosslinked adhesive.

9. The projection screen of claim 8, wherein the ultraviolet curable adhesive exhibits minimal shrinkage when cured.

10. A projection screen comprising:
a first substrate located proximate to a second substrate to form a seam therebetween, wherein the first substrate and second substrate each comprise a first side coated with an optically functional material thereby forming a part of a projection screen having a gain; and a backer adhered to the first and second substrates over a seam edge portion of the first substrate, a seam edge portion of the second substrate, and the seam between the first and second substrates, wherein a first portion of an adhesive is located between the backer and the first side of the first and second substrate and a second portion of the adhesive extends into a seam in the join;

wherein the adhesive comprises a UV crosslinked pressure sensitive adhesive; and wherein the first and second substrates each comprise a solid body throughout the respective seam edge portion and perforations are formed through the first and second substrates outside the respective seam edge portion of the first and second substrates whereby the tensile strength between the backer and the seam edge portions of the first and second substrates is substantially consistent throughout the seam edge portions.

11. The projection screen of claim 10, wherein the second portion of the adhesive does not overlap the first side of the first and second substrates.

* * * * *